US009812700B2

(12) United States Patent
Okamoto (10) Patent No.: US 9,812,700 B2
(45) Date of Patent: Nov. 7, 2017

(54) METHOD FOR PRODUCING POROUS ALUMINUM FOIL, POROUS ALUMINUM FOIL, POSITIVE ELECTRODE CURRENT COLLECTOR FOR ELECTRICAL STORAGE DEVICES, ELECTRODE FOR ELECTRICAL STORAGE DEVICES, AND ELECTRICAL STORAGE DEVICE

(71) Applicant: HITACHI METALS, LTD., Tokyo (JP)

(72) Inventor: Atsushi Okamoto, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/354,237

(22) PCT Filed: Oct. 25, 2012

(86) PCT No.: PCT/JP2012/077538
§ 371 (c)(1),
(2) Date: May 30, 2014

(87) PCT Pub. No.: WO2013/062026
PCT Pub. Date: May 2, 2013

(65) Prior Publication Data
US 2014/0272598 A1    Sep. 18, 2014

(30) Foreign Application Priority Data

Oct. 27, 2011 (JP) ................................. 2011-235858

(51) Int. Cl.
| H01M 4/04 | (2006.01) |
| H01M 4/06 | (2006.01) |
| C25D 1/04 | (2006.01) |
| C25D 1/20 | (2006.01) |
| C25D 3/44 | (2006.01) |
| H01G 11/68 | (2013.01) |
| H01G 11/70 | (2013.01) |
| H01M 4/66 | (2006.01) |

(52) U.S. Cl.
CPC ............ *H01M 4/0469* (2013.01); *C25D 1/04* (2013.01); *C25D 1/20* (2013.01); *C25D 3/44* (2013.01); *H01G 11/68* (2013.01); *H01G 11/70* (2013.01); *H01M 4/661* (2013.01); *Y02E 60/13* (2013.01)

(58) Field of Classification Search
None
See application file for complete search history.

(56) References Cited

U.S. PATENT DOCUMENTS

| 4,925,738 A * | 5/1990 | Tsuya ..................... G11B 5/84 |
| | | 428/846.4 |
| 5,041,194 A * | 8/1991 | Mori et al. .................. 205/237 |
| 2006/0194433 A1* | 8/2006 | Saito et al. .................. 438/688 |
| 2011/0253543 A1* | 10/2011 | Hoshi ..................... C25D 3/665 |
| | | 205/50 |

FOREIGN PATENT DOCUMENTS

| CN | 102034959 A |   | 4/2011 |
| JP | 02-070086   |   | 3/1990 |
| JP | H0270086 A  |   | 3/1990 |
| JP | 11097032    | * | 4/1999 |
| JP | 2000-231923 A |   | 8/2000 |
| JP | 2001-189238 A |   | 7/2001 |
| JP | 2007291490  | * | 11/2007 |
| JP | WO 2010044305 | * | 4/2010 |
| JP | 2010-232171 A1 |   | 10/2010 |
| JP | 2012-136735 A1 |   | 7/2012 |
| JP | 2012-136736 A1 |   | 7/2012 |
| JP | 2012-201961 A1 |   | 10/2012 |
| WO | WO 2011/001932 A1 |   | 1/2011 |
| WO | WO 2011/059023 A1 |   | 5/2011 |
| WO | 2011083585 A1 |   | 7/2011 |

OTHER PUBLICATIONS

JP 2007291490-translation.*
Kodumuri, Pradeep, "In-Situ Growth of Porous Alumino-Silicates and Fabrication of Nano-Porous Membranes", ETD Archive. Paper 166, PhD dissertation, May 2009.*
International Search Report for International Application No. PCT/JP2012/077538 dated Feb. 5, 2013.
Extended European Search Report issued on Jul. 22, 2015 to the corresponding European patent application No. 12844049.2.
First Office Action issued on Sep. 28, 2015 to the corresponding Chinese patent application No. 201280052457.6.

* cited by examiner

*Primary Examiner* — Ladan Mohaddes
(74) *Attorney, Agent, or Firm* — Kratz, Quintos & Hanson, LLP (57) ABSTRACT

A method for producing a porous aluminum foil of the present invention is characterized in that a porous aluminum film is formed on a surface of a substrate by electrolysis using a plating solution containing at least (1) a dialkyl sulfone, (2) an aluminum halide, and (3) a nitrogen-containing compound, and having a water content of 100 to 2000 ppm, and then the film is separated from the substrate. The nitrogen-containing compound is preferably at least one selected from the group consisting of an ammonium halide, a hydrogen halide salt of a primary amine, a hydrogen halide salt of a secondary amine, a hydrogen halide salt of a tertiary amine, and a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation).

9 Claims, 5 Drawing Sheets

METHOD FOR PRODUCING POROUS ALUMINUM FOIL, POROUS ALUMINUM FOIL, POSITIVE ELECTRODE CURRENT COLLECTOR FOR ELECTRICAL STORAGE DEVICES, ELECTRODE FOR ELECTRICAL STORAGE DEVICES, AND ELECTRICAL STORAGE DEVICE

TECHNICAL FIELD

The present invention relates to a method for producing a porous aluminum foil which can be used, for example, as a positive electrode current collector for electrical storage devices such as lithium ion secondary batteries and supercapacitors (electrical double-layer capacitors, redox capacitors, lithium ion capacitors, etc.), a porous aluminum foil produced by the production method, a positive electrode current collector for electrical storage devices comprising the porous aluminum foil, an electrode for electrical storage devices comprising the positive electrode current collector for electrical storage devices, and an electrical storage device comprising the electrode for electrical storage devices.

BACKGROUND ART

It is a well-known fact that lithium ion secondary batteries, which have high energy density and whose discharge capacity does not significantly decrease, have been used for a power source for mobile tools such as mobile phones and laptop computers. In recent years, with the miniaturization of mobile tools, there also is a demand for the miniaturization of lithium ion secondary batteries to be mounted therein. In addition, with the development of hybrid cars, solar power generation, and other technologies as a measure to prevent global warming, etc., the application of supercapacitors having high energy density, such as electrical double-layer capacitors, redox capacitors, and lithium ion capacitors, has been increasingly expanding, and there is a demand for a further increase in their energy density.

An electrical storage device, such as the lithium ion secondary battery or the supercapacitor, has a structure in which, for example, a positive electrode, a negative electrode, and a separator made of a polyolefin or the like between them are arranged in an organic electrolytic solution containing a fluorine-containing compound, such as $LiPF_6$ or $NR_4·BF_4$ (R is an alkyl group), as an electrolyte. Generally, the positive electrode includes a positive electrode active material, such as $LiCoO_2$ (lithium cobalt oxide) or active carbon, and a positive electrode current collector, while the negative electrode includes a negative electrode active material, such as graphite or active carbon, and a negative electrode current collector, and, with respect to the shape, the electrodes are each obtained by applying the active material to the surface of the current collector and forming the same into a sheet. The electrodes are each subjected to high voltage and also immersed in the highly corrosive organic electrolytic solution that contains a fluorine-containing compound. Accordingly, materials for the positive electrode current collector, in particular, are required to have excellent electrical conductivity together with excellent corrosion resistance. Under such circumstances, currently, aluminum, which is a good electrical conductor and forms a passive film on the surface to offer excellent corrosion resistance, is almost 100% used as the material for a positive electrode current collector. Incidentally, as materials for the negative electrode current collector, copper, nickel, or the like can be mentioned.

In production of electrical storage devices, application of an active material on a surface of a current collector is required to be conducted with a high adhesion, and desirably into a thickness as large as possible in order for the resulting electrical storage device to have a high energy density. When the adhesion between a current collector and an active material is insufficient, the active material is problematically separated from the current collector due to its own volume expansion or the like during the charge-discharge operation. Such problems are more likely to occur as the thickness of the active material applied becomes larger. In particular, $LiMn_2O_4$ (lithium manganese oxide), $LiFePO_4$ (lithium iron phosphate) or the like, which has recently attracted attention as new active materials for positive electrodes in place of $LiCoO_2$, generally has a smaller particle size than $LiCoO_2$, and therefore, it is difficult to apply these materials on an aluminum foil to be used as a positive electrode current collector with a high adhesion, unless the surface of the aluminum foil is subjected to any surface treatment or surface processing.

A method of roughening a surface of an aluminum foil through a chemical treatment such as etching is thus proposed in Patent Document 1 as a method for enhancing the adhesion between an aluminum foil and a positive electrode active material. As another method for enhancing the adhesion between an aluminum foil and a positive electrode active material, a method of making an aluminum foil porous by subjecting the foil to a mechanical processing such as punching is proposed.

PRIOR ART DOCUMENTS

Patent Documents

Patent Document 1: JP-A-2001-189238

SUMMARY OF THE INVENTION

Problems that the Invention is to Solve

However, the method of roughening a surface of an aluminum foil through a chemical treatment such as etching, as proposed in Patent Document 1, has a problem that a step for roughening a surface of the foil is required after the production of the foil, a problem that it is difficult to ensure a uniformity of the foil thickness, and a problem that etching makes the foil thin to cause a reduction in its strength. Furthermore, the method of making an aluminum foil porous by subjecting the foil to a mechanical processing such as punching has a problem that a step for making the foil porous is required after the production of the foil, a problem that the foil is torn due to the mechanical processing or a protrusion called burr which may cause short circuit of the electrode is formed on the edge of the pore, and a problem that it is difficult to form fine pores.

Thus, an object of the present invention is to provide a novel method for producing a porous aluminum foil which can be used, for example, as a positive electrode current collector for electrical storage devices, a porous aluminum foil produced by the production method, a positive electrode current collector for electrical storage devices comprising the porous aluminum foil, an electrode for electrical storage devices comprising the positive electrode current collector for electrical storage devices, and an electrical storage device comprising the electrode for electrical storage devices.

Means for Solving the Problems

The present inventor has conducted extensive research on the aluminum electroplating technology. The electrodeposition potential of aluminum is lower than the potential for generating hydrogen, and it may thus be impossible to electrodeposit aluminum from an aqueous solution. Accordingly, a non-aqueous plating solution (without water as a solvent) has been used as a plating solution for electroplating of aluminum, and it has been believed that water has to be eliminated as far as possible since water contained in a plating solution is a factor that inhibits the deposition of aluminum, and prevents the formation of a uniform aluminum film on a surface of a substrate. The present inventor thought that a porous aluminum film could be formed on a surface of a substrate, by taking advantage of the adverse effect of water contained in a plating solution on the formation of a uniform aluminum film to thereby partially inhibit the deposition of aluminum on the surface of the substrate, and that a porous aluminum foil could be obtained by separating the film from the substrate. Thus, as a result of intensive studies, the present inventor found that the object of the present invention could be achieved by controlling a water content in a plating solution to an appropriate amount.

A method for producing a porous aluminum foil of the present invention accomplished based on the above findings is characterized in that a porous aluminum film is formed on a surface of a substrate by electrolysis using a plating solution containing at least (1) a dialkyl sulfone, (2) an aluminum halide, and (3) a nitrogen-containing compound, and having a water content of 100 to 2000 ppm, and then the film is separated from the substrate.

A production method is characterized in that in the production method the nitrogen-containing compound is at least one selected from the group consisting of an ammonium halide, a hydrogen halide salt of a primary amine, a hydrogen halide salt of a secondary amine, a hydrogen halide salt of a tertiary amine, and a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation).

A production method is characterized in that in the production method the porous aluminum foil obtained is subjected to a heat treatment.

A production method is characterized in that in the production method the heat treatment is performed at 80 to 550° C.

A production method is characterized in that in the production the dialkyl sulfone is dimethyl sulfone.

A porous aluminum foil of the present invention ischaracterized by having a crystal orientation such that the ratio of the X-ray diffraction intensity of the (111) plane to the X-ray diffraction intensities of other crystal planes is 2.5 or more with respect to a surface of the foil, and having a porosity of 1 to 70%.

A porous aluminum foil of the present invention ischaracterized by being produced by the production method.

A positive electrode current collector for electrical storage devices of the present invention ischaracterized by comprising the porous aluminum foil.

An electrode for electrical storage devices of the present invention is characterized by comprising an electrode active material supported on the porous aluminum foil.

An electrical storage device of the present invention is characterized by comprising the electrode for electrical storage devices.

Effect of the Invention

According to the method for producing a porous aluminum foil of the present invention, it is possible to produce a porous aluminum foil which can be used, for example, as a positive electrode current collector for electrical storage devices, with a fewer number of steps without a step of making an aluminum foil porous after the production of the foil. It is also possible to produce a porous aluminum foil having fine pores which is difficult to be formed by a mechanical processing. Furthermore, the present invention provides a porous aluminum foil produced by the production method of the present invention, a positive electrode current collector for electrical storage devices comprising the porous aluminum foil, an electrode for electrical storage devices comprising the positive electrode current collector for electrical storage devices, and an electrical storage device comprising the electrode for electrical storage devices.

MODE FOR CARRYING OUT THE INVENTION

A method for producing a porous aluminum foil of the present invention is characterized in that a porous aluminum film is formed on a surface of a substrate by electrolysis using a plating solution containing at least (1) a dialkyl sulfone, (2) an aluminum halide, and (3) a nitrogen-containing compound, and having a water content of 100 to 2000 ppm, and then the film is separated from the substrate.

Examples of the dialkyl sulfone to be contained in the plating solution used in the method for producing a porous aluminum foil of the present invention include those having a $C_{1-6}$ alkyl group (straight or branched), such as dimethyl sulfone, diethyl sulfone, dipropyl sulfone, dihexyl sulfone, and methylethyl sulfone. In terms of excellent electrical conductivity, availability, and the like, it is preferable to use dimethyl sulfone.

Examples of the aluminum halide as a solute which is an aluminum source for forming an aluminum film on a surface of a substrate by electrolysis include aluminum chloride and aluminum bromide. In terms of minimizing the content of water in a plating solution, which is a factor that inhibits the deposition of aluminum, it is, in general, preferable to use an anhydride as the aluminum halide. However, in the present invention, a hydrate may be used to utilize water molecules held in the substance as water contained in the plating solution.

The nitrogen-containing compound means a compound having at least one nitrogen atom in one molecule. Suitable examples of a usable nitrogen-containing compound include an ammonium halide, a hydrogen halide salt of a primary amine, a hydrogen halide salt of a secondary amine, a hydrogen halide salt of a tertiary amine, and a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation), which compounds impart to an aluminum film formed on a surface of a substrate by electrolysis a ductility which facilitates the separation of the film from the surface of the substrate. These nitrogen-containing compounds may be used alone or as a mixture of two or more thereof.

Examples of the ammonium halide include ammonium chloride and ammonium bromide. In addition, examples of the primary to tertiary amines include those having a $C_{1-6}$ alkyl group (straight or branched), such as methylamine, dimethylamine, trimethylamine, ethylamine, diethylamine, triethylamine, propylamine, dipropylamine, tripropylamine, hexylamine, and methylethylamine. Examples of the hydrogen halide include hydrogen chloride and hydrogen bromide. Examples of the alkyl group represented by $R^1$ to $R^4$ in the quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium, cation) include $C_{1-6}$ alkyl groups (straight or branched), such as a methyl group, an ethyl group, a propyl group, and a hexyl group. X may be a halide ion such as a chlorine ion, a bromine ion, or an iodine ion, or may also be $BF_4^-$, $PF_6^-$, or the like, for example. Specific examples of the compound include tetramethylammonium chloride, tetramethylammonium bromide, tetramethylammonium iodide, and tetraethylammonium tetrafluoroborate. In terms of facilitating the formation of a high-ductility, high-purity aluminum film at a high film formation rate, particularly preferred examples of the nitrogen-containing compound include hydrochlorides of tertiary amines, such as trimethylamine hydrochloride.

The proportions of a dialkyl sulfone, an aluminum halide, and a nitrogen-containing compound added are preferably such that, for example, per 10 mol of dialkyl sulfone, the amount of aluminum halide is 1.5 to 4.0 mol, more preferably 2.0 to 3.5 mol, and the amount of nitrogen-containing compound is 0.01 to 2.0 mol, more preferably 0.05 to 1.5 mol. When the amount of aluminum halide added is less than 1.5 mol per 10 mol of dialkyl sulfone, this may cause the darkening of the aluminum film formed (a phenomenon called burning) or reduce the film formation efficiency. On the other hand, when it is more than 4.0 mol, the solution resistance of the resulting plating solution may be so high that the plating solution may generate heat and decompose. In addition, when the amount of nitrogen-containing compound added is less than 0.01 mol per 10 mol of dialkyl sulfone, the addition may be unlikely to achieve its effects, that is, effects such as the improvement of the film formation rate owing to the achievement of a plating treatment at a high applied current density based on the improved electrical conductivity of the plating solution, the purity increase or ductility improvement in the aluminum film, etc. On the other hand, when it is more than 2.0 mol, aluminum may not be deposited due to an essential change in the composition of the plating solution.

In the case where an ammonium halide, a hydrogen halide salt of a primary amine, a hydrogen halide salt of a secondary amine, a hydrogen halide salt of a tertiary amine, a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation) or the like is employed as the nitrogen-containing compound, the above composition of the plating solution used in the method for producing a porous aluminum foil of the present invention is according to a composition of a plating solution that is suitable for the production of an aluminum foil and is proposed by the present inventor in WO2011-001932. A characteristic point of the plating solution used in the method for producing a porous aluminum foil of the present invention is in that water, which inhibits the formation of a uniform aluminum film on a surface of a substrate and therefore has been eliminated as far as possible from a plating solution, is allowed to be intentionally contained in an amount of 100 to 2000 ppm. The reason why the water content is defined to 100 to 2000 ppm is as follows. That is, when the water content is less than 100 ppm, water contained in the plating solution may be so small that the deposition of aluminum on a surface of a substrate is hardly inhibited, whereby a porous aluminum film may not be formed on the surface of the substrate. On the other hand, when it is more than 2000 ppm, water contained in the plating solution may be so large that a phenomenon that the aluminum film formed contains a large amount of impurities, a phenomenon that the film is darkened (a phenomenon called burning), or the like may occur. The water content in a plating solution is preferably 200 to 1900 ppm. The method for adjusting the water content in a plating solution is not particularly limited as long as the method results in the water content of 100 to 2000 ppm after the adjustment. The adjustment can be performed by adding a given amount of water to a plating solution prepared, or by adding a given amount of water in advance to a substance which becomes a component of a plating solution and then preparing the plating solution. Alternately, when a substance which becomes a component of a plating solution contains water due to its storage condition or the like, water contained in the substance may be utilized, and when a substance which becomes a component of a plating solution is a hydrate, water held by the substance may be utilized, to adjust the water content. These methods may also be combined.

The electroplating conditions may be such that, for example, the temperature of the plating solution is 80 to 110° C., and the applied current density is 2 to 15 A/dm². The lower limit of the temperature of the plating solution should be determined in consideration of the melting point of the plating solution. It is preferably 85° C., and more preferably 95° C. (when the temperature is below the melting point of the plating solution, the plating solution solidifies, whereby a plating treatment cannot be performed anymore). On the other hand, when the temperature of the plating solution is more than 110° C., this may accelerate the reaction between the aluminum film formed on the surface of the substrate and the plating solution, which increases the incorporation of impurities into the aluminum film, resulting in reduced purity. In addition, when the applied current density is less than 2 A/dm², the film formation efficiency may decrease. On the other hand, when it is more than 15 A/dm², because of the decomposition of a nitrogen-containing compound, etc., it may be impossible to perform a stable plating treatment or to obtain a high-ductility, high-purity aluminum foil. The applied current density is preferably 3 to 12 A/dm². A significant advantage of the plating solution used in the method for producing a porous aluminum foil of the present invention is that a stable plating treatment is possible even when a current density of 10 A/dm² or more is applied, and thus the improvement of the film formation rate can be achieved. Incidentally, the plating treatment time depends on the desired thickness of the aluminum foil, the temperature of the plating solution, the applied current density, and the like, but is usually 1 to 90 minutes (preferably 1 to 30 minutes considering production efficiency).

The substrate for forming a porous aluminum film (cathode) may be, for example, a stainless steel plate, a titanium plate, an aluminum plate, a nickel plate, or the like. Generally, in order to facilitate the separation of an aluminum film from the substrate, it is preferable that the surface of the substrate is made as smooth as possible by mirror finishing, for example. However, a porous aluminum film formed on a surface of a substrate in the present invention has a characteristic in that it can be easily separated even without subjecting the substrate to such processing. The reason thereof is not necessarily clear, but is presumably related to the fact that upon the formation of a porous aluminum film on a surface of a substrate, the concentrations of S and Cl derived from a plating solution increase near the surface of the film that is in contact with the substrate. Incidentally, as a material for the anode, aluminum can be mentioned, for example. The porous aluminum film may be separated from the substrate batchwise, or, alternatively, it is also possible to perform the formation and separation of the porous aluminum film continuously using a cathode drum (e.g., JP-A-6-93490). Incidentally, prior to the separation of the porous aluminum film from the substrate, it is preferable that the plating solution adhering to the surface of the substrate having the porous aluminum film formed thereon is washed with water to be removed, followed by drying.

When it is assumed that the porous aluminum foil produced by the method of the present invention is used as a positive electrode current collector for electrical storage devices, the thickness of the porous aluminum foil (the thickness of the porous aluminum film formed on the surface of the substrate) is preferably, for example, 3 to 200 µm. When the thickness is less than 3 µm, the foil may not have a sufficient strength to be used as a current collector. On the other hand, when it is more than 200 µm, the pores, even if once formed, may be directed to disappear due to further crystal growth of aluminum. Since the pores in the porous aluminum foil produced by the method of the present invention are formed in the course of the formation of the aluminum film on the surface of the substrate, unlike pores formed by a mechanical processing such as punching applied after the foil preparation, the size and the shape are varied, but the size may be generally about from 1 to 500 µm, and typically from 3 to 50 µm. The size of a pore herein means the long diameter of a hole passing through the foil from the front side to the back side thereof. In addition, the porosity may be generally about 1 to 70%. The pore size and the porosity can be changed by adjusting the water content in the plating solution. As the water content in the plating solution increases, the pore size and the porosity tend to increase. A porous aluminum foil having pores having a size of 50 µm or less, for example, can be produced according to the method of the present invention. It is however difficult to produce a porous aluminum foil having such fine pores by a method in which a foil prepared in advance is subjected to a mechanical processing such as punching.

When a positive electrode active material is applied on a surface of a porous aluminum foil having a pore size and a porosity as described above, the positive electrode active material enters the interior of the pores, and hence the adhesion between the foil and the positive electrode active material is increased, whereby the positive electrode active material can be supported strongly on the surface of the foil. When the pore size is less than 1 µm, it may be smaller than the size of the particles of the positive electrode active material such that the pores may fail to contribute to the increase of the adhesion between the foil and the positive electrode active material. On the other hand, when it is more than 500 µm, the foil may not have a sufficient strength to be used as a current collector. When the porosity is less than 1%, the ratio of the pores relative to the foil may be so small that the pores may fail to contribute to the increase of the adhesion between the foil and the positive electrode active material. On the other hand, when it is more than 70%, the foil may not have a sufficient strength to be used as a current collector.

The porous aluminum foil obtained as described above may be subjected to a heat treatment. When the porous aluminum foil is subjected to a heat treatment, it is possible to avoid a problem that water remaining on the surface of the foil causes unstable electrochemical behavior of an electrical storage device in which the foil is used as a positive electrode current collector for the device, to thereby adversely affect the characteristics of the device. In addition, an advantageous effect such as removal of strain in the foil or improvement of tensile strength can be expected. The heat treatment of the aluminum foil may be performed at 80 to 550° C. for 2 to 120 minutes in an atmosphere such as an ambient atmosphere, a reduced pressure atmosphere, or an inert gas atmosphere using argon gas or nitrogen gas, for example. When the temperature of the heat treatment is less than 80° C., the effect of the heat treatment may not be sufficiently achieved. On the other hand, when it is more than 550° C., the aluminum foil approaches the melting point of aluminum (660° C.), which may cause the softening of the foil. In addition, when the heat treatment time is less than 2 minutes, the effect of the heat treatment may not be sufficiently achieved. On the other hand, when it is more than 120 minutes, productivity may be adversely affected. In the light of the above, the temperature of the heat treatment is preferably 100 to 450° C., and more preferably 200 to 350° C. The heat treatment time is preferably 20 to 90 minutes.

Incidentally, as additional components, conductive particles such as carbonaceous particles may also be added to the plating solution used in the method for producing a porous aluminum foil of the present invention. When conductive particles are added to the plating solution, and the conductive particles are thus dispersed and supported in a porous aluminum foil, the conductive particles dispersed and supported in the foil contribute to the reduction of the electrical surface resistance of the foil. In the case where carbonaceous particles as conductive particles are added to the plating solution, it is preferable that the carbonaceous particles have excellent electrical conductivity with a carbon content of 90 mass % or more. Examples thereof include furnace black particles, acetylene black particles, carbon black particles, black lead particles, and graphite particles, as well as carbon nanotubes and carbon nanofibers. The size of carbonaceous particles (depending on the shape, "size" means grain size, diameter, fiber diameter, length, etc., and may also mean the size of an aggregate in the case where the particles are present as aggregates) is preferably 1 nm to 100 more preferably 1 nm to 15 µm, and still more preferably 3 nm to 5 µm. When the size of carbonaceous particles is less than 1 nm, they may be unlikely to contribute to the reduction of the electrical surface resistance of the foil. On the other hand, when it is more than 100 µm, they may be difficult to uniformly disperse in the foil or the plating solution. In addition, it may be impossible to thin a positive electrode current collector. In order for a porous aluminum foil containing carbonaceous particles dispersed and supported therein to have high strength, it is preferable that the size of the carbonaceous particles is 50% or less of the thickness of the foil. The form of the presence of carbonaceous particles dispersed and supported in a foil is not particularly limited. However, in order for the carbonaceous particles to effectively contribute to the reduction of the electrical surface resistance of the foil, it is preferable that at least some of the carbonaceous particles are protruded from the surface of the foil, for example, and thus exposed to the outside. In light of this, the size of carbonaceous particles may be greater than the thickness of the foil. However, in this case, in order for the carbonaceous particles to be firmly supported in the foil, it is preferable that their size is 150% or less of the thickness of the foil. The amount of carbonaceous particles dispersed in the plating solution is preferably $1 \times 10^{-4}$ to 1 g per 100 mL of the plating solution. When the amount dispersed is less than $1 \times 10^{-4}$ g per 100 mL of the plating solution, it may be impossible for the carbonaceous particles to be dispersed and supported in an amount sufficient to contribute to the reduction of the electrical surface resistance of the foil (e.g., 0.01 to 3.0 mass % of the porous aluminum foil containing the carbonaceous particles dispersed and supported therein). On the other hand, when it is more than 1 g per 100 mL of the plating solution, the viscosity of the plating solution may be so high that electroplating may be difficult. It is preferable that the carbonaceous particles are dispersed in the plating solution while thoroughly stirring the plating solution so that the carbonaceous particles are uniformly dispersed in the solution and thus uniformly dispersed and supported in the foil. It is also possible to apply ultrasonic waves as required. Incidentally, the plating solution used in the method for producing a porous aluminum foil of the present invention has an advantage in that the dispersibility of carbonaceous particles is extremely excellent even without adding a dispersant to the plating solution or surface-treating carbonaceous particles to enhance the dispersibility of carbonaceous particles in the plating solution.

The porous aluminum foil produced by the method of the present invention is a foil having a characteristic crystal orientation which has heretofore not been known and the (111) plane is preferentially oriented with respect to the surface of the foil. The ratio of the X-ray diffraction intensity of the (111) plane to the X-ray diffraction intensities of other crystal planes ((200), (220), (311), (222) planes, etc.) is 2.5 or more. This characteristic crystal orientation does not substantially vary even when the foil is subjected to a heat treatment.

EXAMPLES

Hereinafter, the present invention will be described in detail with reference to the examples, but the present invention should not be construed by being limited to the following descriptions.

Example 1

(A) Production of Porous Aluminum Foil

Figure 1:
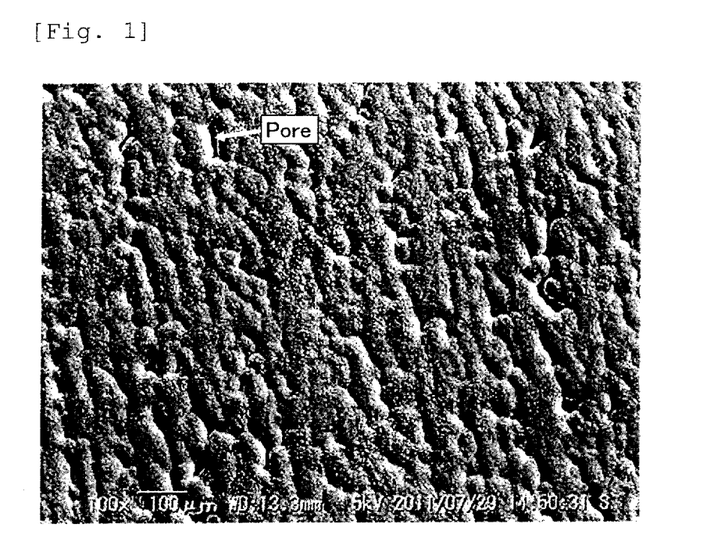
FIG. 1 shows a scanning electron microscope photograph of the front side (the side opposite to the side facing the substrate) of a porous aluminum foil produced in Example 1.
Figure 2:
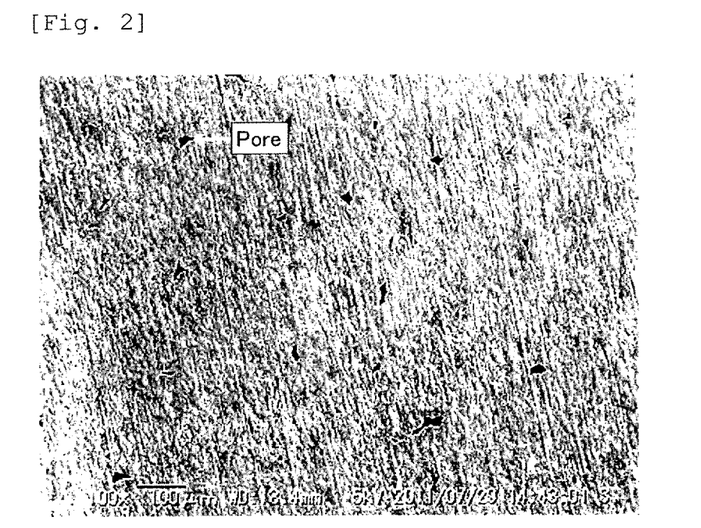
FIG. 2 shows a scanning electron microscope photograph of the back side (the side facing the substrate) of the same porous aluminum foil.
Figure 3:
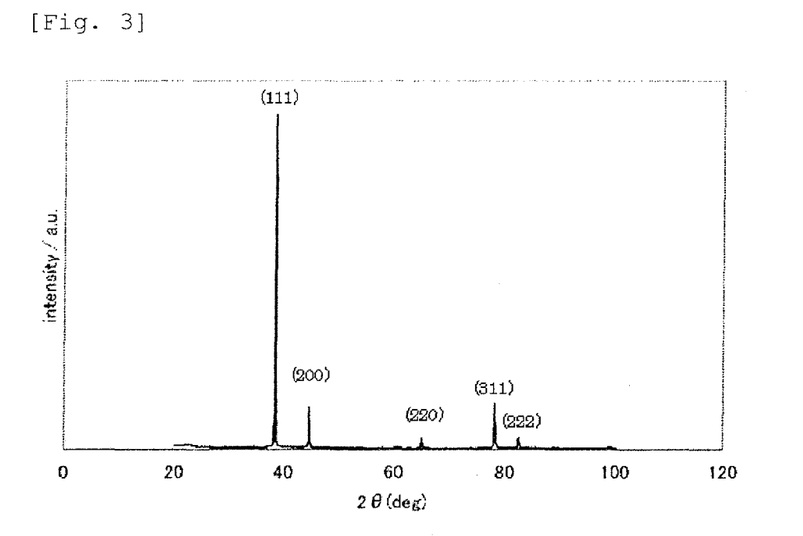
FIG. 3 shows an X-ray diffraction chart indicating the crystal orientation of the same porous aluminum foil.
Figure 4:
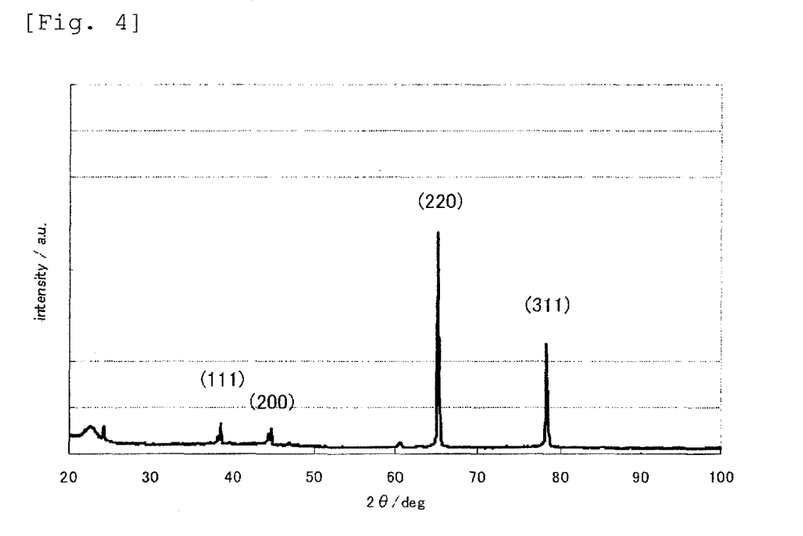
FIG. 4 shows an X-ray diffraction chart indicating the crystal orientation of an aluminum foil produced by rolling (Reference Example).

Dimethyl sulfone, aluminum chloride, and trimethylamine hydrochloride as reagents were used to produce a porous aluminum foil according to the following procedure. Dimethyl sulfone had a water content of 109 ppm, aluminum chloride had that of 40 ppm, and trimethylamine hydrochloride had that of 95 ppm (measured with Moisture Meter CA-100, manufactured by Mitsubishi Chemical Corporation; the same hereinafter). These three reagents were mixed under nitrogen gas flow in a molar ratio of dimethyl sulfone: aluminum chloride trimethylamine hydrochloride of 10:3: 0.01 and dissolved at 110° C., thereby preparing an aluminum electroplating solution. The water content in this plating solution was 200 ppm. Using this water-containing plating solution together with an aluminum plate having a purity of 99.99 mass % as an anode and a titanium plate as a cathode (a substrate for forming an aluminum film), an electroplating treatment was performed for 60 minutes at an applied current density of 5 A/dm$^2$ while stirring the plating solution maintained at 95° C. at a stirring rate of 300 rpm. After 60 minutes, the titanium plate having an aluminum film formed on the surface thereof was removed from the plating solution, washed with water, and then dried. Subsequently, from the end portion thereof, forceps were inserted between the aluminum film and the titanium plate and moved to slide along the titanium plate. As a result, the aluminum film was easily separated from the titanium plate to give an aluminum foil. This aluminum foil was subjected to a heat treatment in an ambient atmosphere at 300° C. for 60 minutes. The thickness of the resulting aluminum foil was about 12 µm. The scanning electron microscope photographs (apparatus: VE-8800, manufactured by Keyence Corporation; the same hereinafter) of the front side (the side opposite to the side facing the titanium plate) and the back side (the side facing the titanium plate) of this aluminum foil are shown in FIGS. 1 and 2 respectively. As is clear from FIGS. 1 and 2, this aluminum foil was a porous foil having a large number of fine pores having a size of 20 µm or less, and the porosity thereof was about 30%. The porosity of the porous aluminum foil was determined by an image analysis of a scanning electron microscope photograph (magnification: ×100) of any 1 mm square view of the foil (the same hereinafter). The front side of this porous aluminum foil was measured for the X-ray diffraction peak using an X-ray diffractometer (D8 ADVANCE: manufactured by Bruker AXS, a θ-2θ method using CuKα ray as the X-ray; the same hereinafter). The result is shown in FIG. 3. As is clear from FIG. 3, the crystal orientation was such that the (111) plane was preferentially oriented with respect to the surface of the foil, and the ratio of the X-ray diffraction intensity of the (111) plane to the X-ray diffraction intensity of the (200) plane (X-ray diffraction intensity of (111) plane/X-ray diffraction intensity of (200) plane) was a characteristic value of 7.7. The similar result was obtained in the measurement for the backside of the foil. The crystal orientation of this porous aluminum foil was quite different from that of the aluminum foil produced by rolling (an X-ray diffraction peak of a rolled aluminum foil having a thickness of 20 μm manufactured by Nippon Foil Mfg. Co., Ltd. is shown in FIG. 4 as a reference example).

Figure 5:
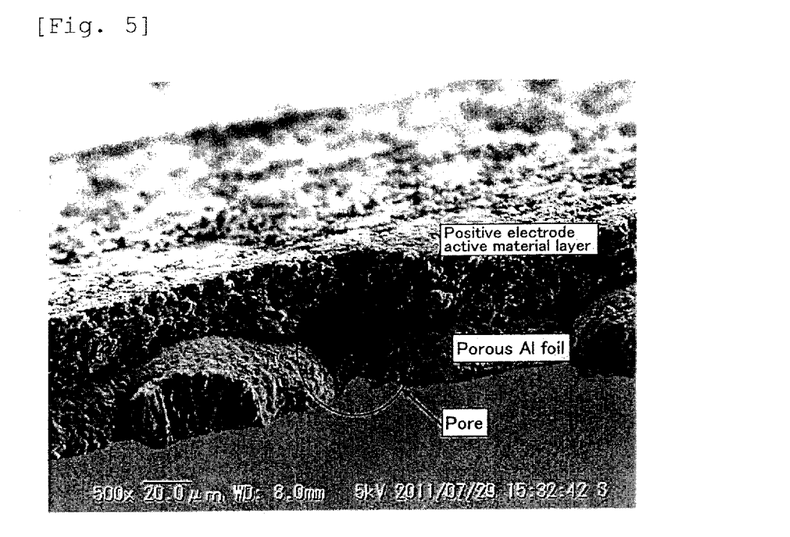
FIG. 5 shows a scanning electron microscope photograph of a cross-section of an electrode (positive electrode) for electrical storage devices fabricated using the porous aluminum foil produced in Example 1.
Figure 6:
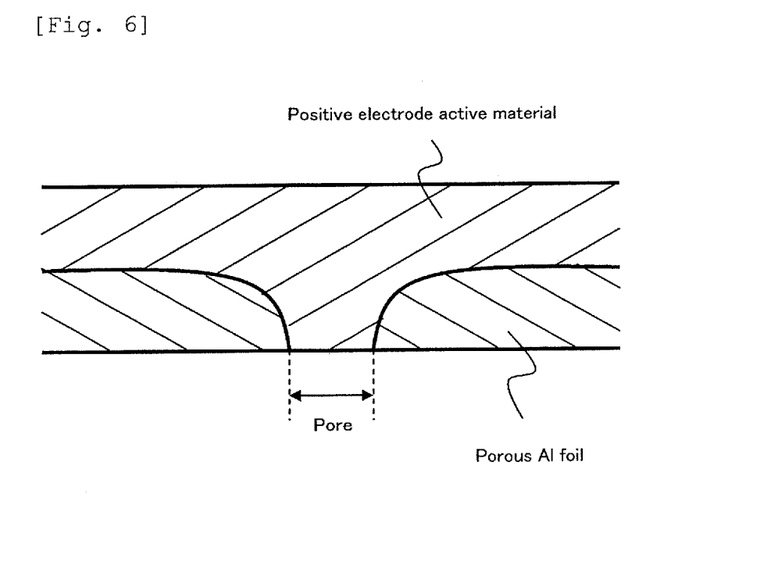
FIG. 6 is a schematic view of the same cross-section.

(B) Production of Electrode (Positive Electrode) for Electrical Storage Devices and Evaluation Thereof The porous aluminum foil obtained above was used as a positive electrode current collector for electrical storage devices. To the surface thereof, a slurry prepared by mixing lithium manganese oxide, acetylene black, and polyvinylidene fluoride in a weight ratio of 8:1:1 was applied using a doctor blade, followed by vacuum drying at 80° C. for 24 hours to form a positive electrode active material layer on the surface of the foil. Thus, an electrode (positive electrode) for electrical storage devices having a total thickness of about 40 μm was produced. A cross-cut was formed on the thus obtained electrode, and then this electrode was immersed in an organic electrolyte solution obtained by dissolving lithium hexafluorophosphate in a mixture solvent of 1:1 volume ratio of ethylene carbonate (EC) and dimethyl carbonate (DMC) into a concentration of 1 mol/L (1 mol/L LiPF$_6$/EC+DMC (1:1 by vol.)). After left to stand in a vacuum atmosphere for 15 minutes, the electrode was removed from the solution, roughly washed with water, and dried with hot-air drier. Subsequently, the adhesion between the foil and the positive electrode active material was evaluated by a tape separation test, and then a good adhesion was exhibited. A scanning electronic microscopic photograph of the cross-section of the electrode is shown in FIG. 5. A schematic view of the cross-section is shown in FIG. 6. As is clear from FIGS. 5 and 6, the positive electrode active material layer on the surface of the foil was formed such that the positive electrode active material entered the interior of a pore in the foil. It was confirmed that the pores in the foil contributed to the enhancement of the adhesion between the foil and the positive electrode active material. An electrical storage device which was fabricated using this electrode so as to have a configuration known per se had a desired performance.

Example 2

An electrode (positive electrode) for electrical storage devices was produced according to the same procedure as in Example 1 except for using the aluminum foil before the heat treatment in the ambient atmosphere at 300° C. for 60 minutes in Example 1. This aluminum foil before the heat treatment was a porous foil having a structural features similar to that of the aluminum foil after the heat treatment (however, the ratio of the X-ray diffraction intensity of the (111) plane to the X-ray diffraction intensity of the (200) plane was 8.7, which was slightly higher than that after the heat treatment).

Example 3

(A) Production of Porous Aluminum Foil

Dimethyl sulfone, aluminum chloride, and trimethylamine hydrochloride, used in Example 1, after each was dried in vacuum for 24 hours, were mixed under nitrogen gas flow in a molar ratio of dimethyl sulfone:aluminum chloride: trimethylamine hydrochloride of 10:3:0.05 and dissolved at 110° C., thereby preparing an aluminum electroplating solution. The water content in this plating solution was 100 ppm. Using this water-containing plating solution, an aluminum film was formed on a surface of a titanium plate according to the same procedure as in Example 1 except that an applied current density was 10 A/dm$^2$, and then the aluminum film was separated from the titanium plate to obtain an aluminum foil. This aluminum foil was subjected to a heat treatment in an ambient atmosphere at 300° C. for 60 minutes. The thickness of the resulting aluminum foil was about 45 μm. This aluminum foil was a porous foil having a large number of fine pores having a size of 8 μm or less, and the porosity thereof was about 3%. As for the crystal orientation of this porous aluminum foil, the (111) plane was preferentially oriented with respect to the surface of the foil, similar to the crystal orientation of the porous aluminum foil of Example 1, and the ratio of the X-ray diffraction intensity of the (111) plane to the X-ray diffraction intensity of the (200) plane was a characteristic value of 5.0.

Figure 7:
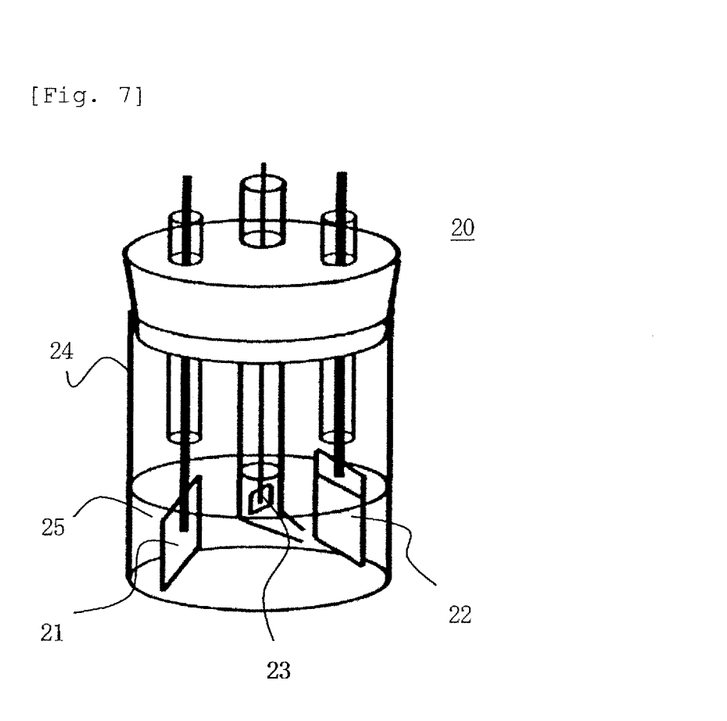
FIG. 7 is a schematic view of an experimental apparatus for evaluating electrodes (positive electrodes) for electrical storage devices by a charge-discharge test in Example 3 and Comparative Example 3.
Figure 8:
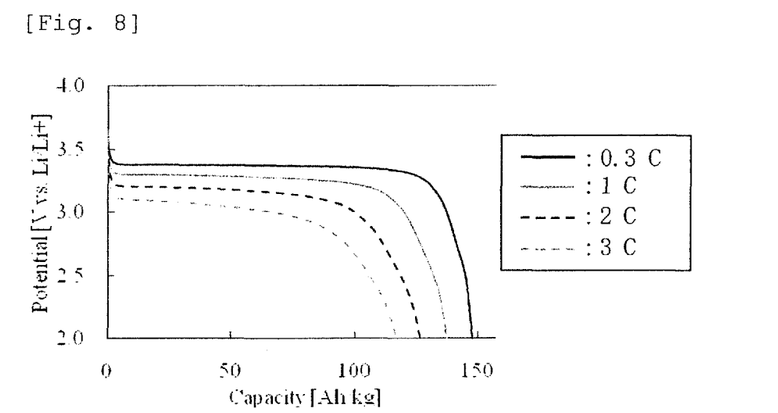
FIG. 8 is a graph showing a result of the charge-discharge test in Example 3 (in the case of using a porous aluminum foil).

(B) Production of Electrode (Positive Electrode) for Electrical Storage Devices and Evaluation Thereof The porous aluminum foil obtained above was used as a positive electrode current collector for electrical storage devices. To the surface thereof, a slurry prepared by mixing lithium iron phosphate, acetylene black, and polyvinylidene fluoride in a weight ratio of 9:0.5:0.5 was applied using a doctor blade, followed by vacuum drying at 80° C. for 24 hours to form a positive electrode active material layer on the surface of the foil. Thus, an electrode (positive electrode) for electrical storage devices having a total thickness of about 70 μm was produced. The electrode was evaluated using an experimental apparatus shown in FIG. 7 according to the following procedure. An organic electrolyte solution 25 was poured in a container 24 in the experimental apparatus 20. A solution which was obtained by dissolving lithium hexafluorophosphate in a mixture solvent of 1:1 volume ratio of ethylene carbonate (EC) and dimethyl carbonate (DMC) into a concentration of 1 mol/L (1 mol/L LiPF$_6$/EC+DMC (1:1 by vol.)) was used as the organic electrolyte solution 25. A positive electrode 21 produced according to the above procedure, a negative electrode 22 made of a lithium foil, and a reference electrode 23 made of a lithium foil were placed in this organic electrolyte solution 25, and a charge-discharge test was performed. The charge-discharge rate was set to 0.3 C, 1 C, 2 C, or 3 C (C means a charge-discharge rate. 0.3 C means that one charge-discharge cycle is completed in 200 minutes, 1 C means that one charge-discharge cycle is completed in 1 hour, 2 C means that one charge-discharge cycle is completed in 30 minutes, and 3 C means that one charge-discharge cycle is completed in 20 minutes). The discharge behaviors in the respective charge-discharge rate are shown in FIG. 8 (The horizontal axis shows discharge capacity and the vertical axis shows potential applied to the positive electrode). As is clear from FIG. 8, although a higher charge-discharge rate generally leads to a lower discharge capacity, when using the positive electrode produced according to the above procedure, the decrease of the discharge capacity was relatively small. That is, the discharge capacity at the charge-discharge rate of 0.3 C was 148 Ah/kg, while the discharge capacity at the charge-discharge rate of 3 C was 117 Ah/kg, and the reduction of the discharge capacity was suppressed to 25% or less. This is due to that the adhesion between the active material and the current collector was good and thus electrons were smoothly exchanged between the active material and the current collector, resulting in reduction of energy loss within the electrodes. It was found from the results described above that the use of the porous aluminum foil of the present invention as a positive electrode current collector for electrical storage devices makes it possible to produce an electrical storage device that can achieve a small energy loss.

Example 4

Water was intentionally added to trimethylamine hydrochloride used in Example 1 to make its water content 1900 ppm. This trimethylamine hydrochloride was mixed with dimethyl sulfone and aluminum chloride used in Example 1 under nitrogen gas flow in a molar ratio of dimethyl sulfone: aluminum chloride:trimethylamine hydrochloride of 10:3: 0.05 and dissolved at 110° C., thereby preparing an aluminum electroplating solution. The water content in this plating solution was 998 ppm. Using this water-containing plating solution, an aluminum film was formed on a surface of a titanium plate according to the same procedure as in Example 1, and then the aluminum film was separated from the titanium plate to obtain an aluminum foil. This aluminum foil was subjected to a heat treatment in an ambient atmosphere at 300° C. for 60 minutes. The thickness of the resulting aluminum foil was about 150 μm. This aluminum foil was a porous foil having a large number of fine pores having a size of 80 μm or less, and the porosity thereof was about 50%. As for the crystal orientation of this porous aluminum foil, the (111) plane was preferentially oriented with respect to the surface of the foil, similar to the crystal orientation of the porous aluminum foil of Example 1, and the ratio of the X-ray diffraction intensity of the (111) plane to the X-ray diffraction intensity of the (200) plane was a characteristic value of 2.8.

Example 5

Water was intentionally added to dimethyl sulfone used in Example 1 to make its water content 1000 ppm. This dimethyl sulfone was mixed with aluminum chloride and trimethylamine hydrochloride used in Example 1 under nitrogen gas flow in a molar ratio of dimethyl sulfone: aluminum chloride trimethylamine hydrochloride of 10:3: 0.05 and dissolved at 110° C., thereby preparing an aluminum electroplating solution. The water content in this plating solution was 1860 ppm. Using this water-containing plating solution, an aluminum film was formed on a surface of a titanium plate according to the same procedure as in Example 1 except that an applied current density was 3 A/dm$^2$, and then the aluminum film was separated from the titanium plate to obtain an aluminum foil. This aluminum foil was subjected to a heat treatment in an ambient atmosphere at 300° C. for 60 minutes. The thickness of the resulting aluminum foil was about 100 μm. This aluminum foil was a porous foil having a large number of pores having a size of 400 μm or less, and the porosity thereof was 60 to 70%. As for the crystal orientation of this porous aluminum foil, the (111) plane was preferentially oriented with respect to the surface of the foil, similar to the crystal orientation of the porous aluminum foil of Example 1, and the ratio of the X-ray diffraction intensity of the (111) plane to the X-ray diffraction intensity of the (200) plane was a characteristic value of 3.4.

Example 6

Dimethyl sulfone, aluminum chloride, and trimethylamine hydrochloride, used in Example 1, after each was dried in vacuum for 24 hours, were mixed under nitrogen gas flow in a molar ratio of dimethyl sulfone:aluminum chloride: trimethylamine hydrochloride of 10:3:0.01 and dissolved at 110° C., thereby preparing an aluminum electroplating solution. Water was intentionally added to this plating solution to make its water content 1900 ppm. Using this water-containing plating solution, an aluminum film was formed on a surface of a titanium plate according to the same procedure as in Example 1 except that an applied current density was 15 A/dm$^2$, and then the aluminum film was separated from the titanium plate to obtain an aluminum foil. This aluminum foil was subjected to a heat treatment in an ambient atmosphere at 300° C. for 60 minutes. The thickness of the resulting aluminum foil was about 50 μm. This aluminum foil was a porous foil having a large number of fine pores having a size of 100 μm or less, and the porosity thereof was 60 to 70%. As for the crystal orientation of this porous aluminum foil, the (111) plane was preferentially oriented with respect to the surface of the foil, similar to the crystal orientation of the porous aluminum foil of Example 1, and the ratio of the X-ray diffraction intensity of the (111) plane to the X-ray diffraction intensity of the (200) plane was a characteristic value of 3.8.

Example 7

A porous aluminum foil was obtained according to the same procedure as in Example 1 except for using ammonium chloride in place of trimethylamine hydrochloride. The thickness of the resulting aluminum foil was about 13 μm. This aluminum foil was a porous foil having a large number of fine pores having a size of 10 μm or less, and the porosity thereof was about 15%. As for the crystal orientation of this porous aluminum foil, the (111) plane was preferentially oriented with respect to the surface of the foil, similar to the crystal orientation of the porous aluminum foil of Example 1, and the ratio of the X-ray diffraction intensity of the (111) plane to the X-ray diffraction intensity of the (200) plane was a characteristic value of 4.2.

Example 8

A porous aluminum foil was obtained according to the same procedure as in Example 1 except for using tetramethylammonium chloride in place of trimethylamine hydrochloride. The thickness of the resulting aluminum foil was about 9 μm. This aluminum foil was a porous foil having a large number of fine pores having a size of 20 μm or less, and the porosity thereof was about 40%. As for the crystal orientation of this porous aluminum foil, the (111) plane was preferentially oriented with respect to the surface of the foil, similar to the crystal orientation of the porous aluminum foil of Example 1, and the ratio of the X-ray diffraction intensity of the (111) plane to the X-ray diffraction intensity of the (200) plane was a characteristic value of 2.6.

Example 9

A slurry obtained by mixing active carbon, acetylene black, and polyvinylidene fluoride in a weight ratio of 9:0.5:0.5 was applied using a doctor blade in place of a slurry prepared by mixing lithium manganese oxide, acetylene black, and polyvinylidene fluoride in a weight ratio of 8:1:1 used in the production of the electrode (positive electrode) for electrical storage devices in Example 1, followed by vacuum drying at 80° C. for 24 hours to form a positive electrode active material layer on the surface of the foil, thereby producing an electrode (positive electrode) for electrical storage devices having a total thickness of about 30 μm.

Example 10

A porous aluminum foil was obtained according to the same procedure as in Example 1 except that dimethyl sulfone, aluminum chloride, and trimethylamine hydrochloride were mixed in a molar ratio of 10:4:0.01. The thickness of the resulting aluminum foil was about 13 μm. This aluminum foil was a porous foil having a large number of fine pores having a size of 10 μm or less, and the porosity thereof was about 5%. As for the crystal orientation of this porous aluminum foil, the (111) plane was preferentially oriented with respect to the surface of the foil, similar to the crystal orientation of the porous aluminum foil of Example 1, and the ratio of the X-ray diffraction intensity of the (111) plane to the X-ray diffraction intensity of the (200) plane was a characteristic value of 11.0.

Comparative Example 1

Dimethylsulfone, aluminum chloride, and trimethylamine hydrochloride, used in Example 1, after each was dried in vacuume for 24 hours, were mixed under a drying atmosphere having a dew point of −100° C. or less in a molar ratio of dimethyl sulufone:aluminum chloride:trimethylamine hydrochloride of 10:3:0.01 and dissolved at 110° C., thereby preparing an aluminum electroplating solution. The water content in this plating solution was 70 ppm. Using this plating solution, an aluminum film was formed on a surface of a titanium plate according to the same procedure as in Example 1, and then the aluminum film was separated from the titanium plate to obtain an aluminum foil. This aluminum foil was subjected to a heat treatment in an ambient atmosphere at 300° C. for 60 minutes. The thickness of the resulting aluminum foil was about 12 μm. This aluminum foil was a uniform one in which no pore was confirmed by an image analysis of a scanning electron microscope photograph (the porosity thereof was 0%). Thus, it was found that when a plating solution having a water content of 70 ppm was used, the water content in the plating solution was too small to provide a porous aluminum foil.

Comparative Example 2

It was tried to obtain a porous aluminum foil according to the same procedure as in Example 6 except that water was intentionally added to a plating solution to make its water content 2500 ppm, but an aluminum film was partially darkened or coating unevenness in a form of line occurred during the formation of the film on a surface of a titanium plate. Thus, it was found that when a plating solution having a water content of 2500 ppm was used, the water content in the plating solution was too large to provide a porous aluminum foil.

Comparative Example 3

Figure 9:
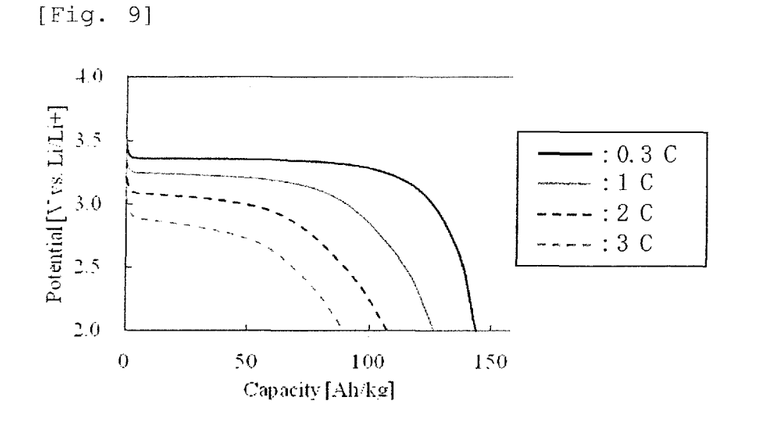
FIG. 9 is a graph showing a result of the charge-discharge test in Comparative Example 3 (in the case of using a rolled aluminum foil).

A positive electrode active material layer was formed on a surface of a commercially available rolled aluminum foil having a thickness of 15 μm (manufactured by Nippon Foil Mfg. Co., Ltd.) according to the same procedure as in Example 1(B). Thus, an electrode (positive electrode) for electrical storage devices having a total thickness of about 40 μm was produced. The adhesion between the foil and the positive electrode active material in this electrode was evaluated according to the same procedure as in Example 1(B). Then, a sheet-shaped positive electrode active material layer was separated from the foil during a drying step of the electrode before a tape separation test. This rolled aluminum foil was used as a positive electrode current collector for electrical storage devices to produce an electrode (positive electrode) for electrical storage devices according to the same procedure as in Example 3(B), and a charge-discharge test was performed using an experimental apparatus shown in FIG. 7. The result is shown in FIG. 9. As is clear from FIG. 9, when using this positive electrode, the discharge capacity significantly decreased. The discharge capacity at the charge-discharge rate of 0.3 C was 144 Ah/kg, while the discharge capacity at the charge-discharge rate of 3 C was 90 Ah/kg, and the reduction of the discharge capacity was 38%.

INDUSTRIAL APPLICABILITY

The present invention has an industrial applicability in that a novel method for producing a porous aluminum foil which can be used, for example, as a positive electrode current collector for electrical storage devices, a porous aluminum foil produced by the production method, a positive electrode current collector for electrical storage devices comprising the porous aluminum foil, an electrode for electrical storage devices comprising the positive electrode current collector for electrical storage devices, and an electrical storage device comprising the electrode for electrical storage devices, can be provided.

The invention claimed is:

1. A method for producing a porous aluminum foil, characterized in that a porous aluminum film is formed on a surface of a substrate by electrolysis using a plating solution containing at least (1) a dialkyl sulfone, (2) an aluminum halide in an amount of 1.5 to 4.0 mol per 10 mol of the dialkyl sulfone, (3) a nitrogen-containing compound in an amount of 0.01 to 2.0 mol per 10 mol of the dialkyl sulfone, and (4) an added water content of 100 to 2000 ppm, and the film is then separated from the substrate.

2. A production method according to claim 1, characterized in that the nitrogen-containing compound is at least one selected from the group consisting of an ammonium halide, a hydrogen halide salt of a primary amine, a hydrogen halide salt of a secondary amine, a hydrogen halide salt of a tertiary amine, and a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation).

3. A production method according to claim 1, characterized in that the porous aluminum foil obtained is subjected to a heat treatment.

4. A production method according to claim 3, characterized in that the heat treatment is performed at 80 to 550° C.

5. A production method according to claim 1, characterized in that the dialkyl sulfone is dimethyl sulfone.

6. A porous metal aluminum foil, characterized by having a crystal orientation such that the ratio of the X-ray diffraction intensity of (111) plane to the X-ray diffraction intensities of other crystal planes is 2.5 or more with respect to a surface of the foil, and having a porosity of 1 to 70% and a pore size of 1 μm to 500 μm, the pores being holes that pass through the porous metal aluminum foil from a front side to a back side thereof and the size and shape of the pores being varied.

7. A positive electrode current collector for electrical storage devices, characterized by comprising the porous metal aluminum foil of claim 6.

8. An electrode for electrical storage devices, characterized by comprising an electrode active material supported on the porous metal aluminum foil of claim 6.

9. An electrical storage device, characterized by comprising the electrode for electrical storage devices of claim 8.

\* \* \* \* \*